(12) United States Patent
Luenstroth et al.

(10) Patent No.: US 10,331,548 B2
(45) Date of Patent: Jun. 25, 2019

(54) METHOD AND COMPUTER SYSTEM FOR COMPILING AND TESTING A CONTROL PROGRAM

(71) Applicant: dSPACE digital signal processing and control engineering GmbH, Paderborn (DE)

(72) Inventors: Frank Luenstroth, Delbrueck (DE); Renate Hein, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 364 days.

(21) Appl. No.: 15/229,231

(22) Filed: Aug. 5, 2016

(65) Prior Publication Data

US 2018/0039566 A1   Feb. 8, 2018

(51) Int. Cl.
*G06F 11/36* (2006.01)
*G06F 8/41* (2018.01)

(52) U.S. Cl.
CPC .......... *G06F 11/3668* (2013.01); *G06F 8/41* (2013.01); *G06F 8/4441* (2013.01); *G06F 8/4452* (2013.01)

(58) Field of Classification Search
CPC ...... G06F 11/3668; G06F 8/41; G06F 8/4441; G06F 8/4452
See application file for complete search history.

(56) References Cited

U.S. PATENT DOCUMENTS 7,490,032 B1 * 2/2009 Koh .................. G06F 17/5009
703/22
8,209,158 B1 * 6/2012 Fielder ............... G06F 17/5009
703/13

OTHER PUBLICATIONS

H. Hanselmann et al., "Production Quality Code Generation from Simulink Block Diagrams", Proceedings of the 1999 IEEE International Symposium on Computer Aided Control System Design, pp. 213-218, Kohala-Coast, Hawai'i, USA (Aug. 22, 1999-Aug. 27, 1999).

* cited by examiner

*Primary Examiner* — Viva Miller
(74) *Attorney, Agent, or Firm* — Muncy, Geissler, Olds & Lowe, P.C.

(57) ABSTRACT

A computer-implemented method for testing a control program that is modeled as one or more blocks of a block diagram in a computing environment. A first user interface is provided for selecting a simulation mode for the block diagram and a second user interface is provided for selecting a compiler intended for production code compilation. When it is confirmed that a software-in-the-loop simulation mode has been selected in the first user interface, the blocks of the block diagram are converted to a production code and is compiled to an executable using the compiler selected in the second user interface. By running the executable on the host computer while recording one or more data points based on input/output signals and/or evaluating the compliance of the one or more data points to one or more criteria, the control program corresponding to the one or more blocks is tested.

20 Claims, 4 Drawing Sheets

METHOD AND COMPUTER SYSTEM FOR COMPILING AND TESTING A CONTROL PROGRAM

BACKGROUND OF THE INVENTION

Field of the Invention

The present invention relates to methods and computer systems for automatically generating code from block diagrams, the code preferably being used in electronic control units. In particular, the present invention concerns methods and computer systems for compiling and testing a control program.

Description of the Background Art

Electronic control units (ECUs) are ubiquitous especially in automotive applications; generally, they may contain a microprocessor, in particular a microcontroller, one or more sensor interfaces and one or more circuits to control, for example, an actuator. Current parameters of a physical process are preferably determined using the signals of the one or more sensors connected to the sensor interfaces. Based on a predefined control strategy, the microprocessor may control the one or more circuits to apply the actuators in order to influence the physical process. In a particular example, an ECU may be used to perform anti-lock braking, with a sensor measuring the wheel velocity and a magnetic valve reducing the pressure in the corresponding wheel brakes.

In order to speed up the development process for ECUs, control strategies are preferably developed using block diagrams in a technical computing environment (abbreviated as TCE), which allows for tracing the temporal behavior of a physical system described by one or more blocks in the block diagram. One particular example of a TCE is Matlab/Simulink of The MathWorks.

The document "Production Quality Code Generation from Simulink Block Diagrams", Proceedings of the 1999 IEEE International Symposium on Computer Aided Control System Design, Kohala-Coast, Hawai'i, USA, by H. Hanselmann et al. describes a system for automatically generating production code based on a block diagram containing one or more blocks that specify the functionality of the program. The program may in particular be a control program for an ECU, the control program implementing the desired control strategy. In general, processors used in ECUs have a considerably lower processing power than a general-purpose microprocessor in a standard computer. For this reason, the production code is preferably optimized for size and/or execution time. As a particular example, high-precision floating-point calculations used in a reference simulation of the block diagram on a host computer may then be converted to lower-precision fixed-point calculations in the production code. The production code needs to be tested in order to ascertain that the functionality of the control program was not changed by the optimizations.

U.S. Pat. No. 8,209,158 B1 by Fielder et al. teaches a processor-in-the-loop co-simulation of a model. A host technical computing environment provides a graphical environment to facilitate construction of a model of a system, the model being defined as a plurality of functional blocks. Via graphical selection menus associated with the plurality of functional blocks of the model, an indication is received of which of the plurality of blocks are to be simulated at an external target device, and which of the plurality of blocks are to be simulated at the host technical computing environment. When a command to start a simulation of the model is received, a co-simulation of the model at the host technical computing environment and the external target device is executed. For this purpose, a production code is generated from the blocks to be simulated at the external target device and then the production code is compiled using a cross-compiler. While a processor-in-the-loop simulation allows for a detailed code validation, possibly including an analysis of the execution time and stack consumption, the need for an external target device and the restricted diagnostic possibilities limit its applicability to a late phase in the development of an ECU executing the control program.

Even before an embedded system is available as a prototype for the ECU, an off-line simulation on the host computer may be used to test the control program. For this so-called software-in-the-loop simulation, production code is generated and compiled to an executable for the host computer. By adding a communication function for exchanging signals, the executable may run concurrently with a plant model executed in the simulation engine in order to describe a full control loop. A disadvantage of current software-in-the-loop simulation modes is that diagnostic capabilities are limited by available compilers certified for the TCE.

Thus, a more flexible and faster testing of the production code generated for implementing a control program is desired.

SUMMARY OF THE INVENTION

It is therefore an object of present invention to provide a method and computer system for compiling and testing a control program.

In an exemplary embodiment of the invention, computer-implemented methods for testing a control program are provided, the control program being modeled as one or more blocks of a block diagram in a technical computing environment on a host computer, wherein preferably the one or more blocks of the block diagram describe an ideal or desired behavior of the control program, i.e. a desired control strategy. Advantageously, the host computer carries out an inventive method that can include: providing a first user interface for selecting a simulation mode for one or more blocks of the block diagram, in particular the one or more blocks corresponding to the control program; providing a second user interface for selecting a compiler intended for production code compilation, the compiler preferably being adapted to the processor of the host computer; verifying that a software-in-the-loop simulation mode has been selected in the first user interface; converting the one or more blocks of the block diagram to a production code using a code generator; compiling the production code to an executable using the compiler selected in the second user interface; running the executable on the host computer, the executable being external to the technical computing environment, while recording one or more data points based on output signals and/or input signals of the executable; and displaying the one or more data points and/or evaluating the compliance of the one or more data points to one or more criteria, in particular comparing the one or more recorded data points to reference data points.

Because the compiler selected in the second user interface is specifically intended for compiling production code, there is no need for the compiler to be adapted to the technical computing environment e.g. concerning file formats or additional data introduced in the compiled code. Any code used when simulating the block diagram in the technical computing environment may be compiled with a second compiler specially certified for use with a simulation engine of the technical computing environment. This allows for choosing any compiler suitable for the host computer as the compiler intended for production code compilation. Advantageously, a compiler that is shipped with a corresponding debugging program may be used for a software-in-the-loop simulation of a control program. Further, a newly released compiler may be used for compiling the production code, irrespective of the question if this particular compiler has already undergone any certification procedure for ensuring compatibility with the technical computing environment. If corresponding compilers (such as GCC, the GNU Compiler Collection) exist both for the host computer and the target platform (i.e. the microcontroller of the ECU), testing the compiler can for the most part be performed on the host computer with a generally much faster processor. A user designing a control program is free to use that compiler which best suits his needs, which allows for an enhanced flexibility when testing the control program on the host computer and speeds up the design of the control program.

The steps of the inventive methods may preferably be carried out by a processor running different software components on the host computer, the software components preferably using the mechanisms of the technical computing environment or of the operating system of the host computer to exchange data and/or cause the execution of one or more further software components. For example, the technical computing environment may comprise and/or be interfaced to a code generator that converts one or more blocks of the block diagram to production code. When the conversion is finished, the code generator may invoke the compiler selected in the second user interface in order to compile the production code to an executable. The processor of the host computer may be a general-purpose microprocessor with high computational speed and no strict limitation on the thermal power produced during the computation.

The host computer may be realized as a single standard computer comprising a processor, a display device and an input device. Alternatively, the host computer may comprise one or more servers comprising one or more processing elements, the servers being connected to a client comprising a display device and an input device via a network. Therefore, the technical computing environment may be executed partially or completely on a remote server, such as in a cloud computing setup. A graphical user interface of the technical computing environment may be displayed on a portable computing device, in particular a computing device with a touch screen interface. In this case, it is particularly advantageous when the computations for executing the block diagram are carried out on a remote server.

The technical computing environment may comprise a graphical user interface for modifying the block diagram and a simulation engine for executing the block diagram, so that the dynamical system described by the block diagram can be simulated. The block diagram may comprise multiple blocks with input and/or output signals that are connected to output and/or input signals of other blocks. Each block may be an atomic functional unit or may be composed of a plurality of subordinate blocks. Preferably, one or more blocks of the block diagram model the desired behavior or intended functionality of the control program. Other blocks may for instance represent test input stimuli for the modeled control program or a plant model connected to the modeled control program to form a model of the complete dynamic system and to provide a closed control loop. Further, the technical computing environment may comprise or be interfaced to a code generator specifically adapted to generate production code which is preferably optimized for execution time and/or code size. Preferably, a user interface may comprise a textual interface for indicating values of parameters of the technical environment and/or the code generator, in particular settings for the code generation. Code generation settings may comprise a desired conversion to fixed-point operations and a corresponding scaling. Additionally or alternatively, a graphical user interface may be invoked by clicking on a specific block in the block diagram using a specific mouse button.

The production code may be adapted to a specific processor, e.g. a particular microprocessor or a programmable logic element, a specific set of language operations, e.g. compliant to a predefined restricted language standard, and/or may be an optimized code, so that e.g. the number of processing operations may be minimized and/or limited to a certain threshold and/or maximum execution time. In an embodiment of the invention, an additional user interface is provided for selecting the scope and/or extent and/or criteria for optimization of the generated production code.

Running the executable external to the technical computing environment preferably indicates that the executable does not form an integral part of the TCE's simulation engine but is being handled by the operating system of the host computer; it maybe in the form of a standalone executable or in the form of a library routine. In case of a host computer running Microsoft Windows, the executable may be realized as a dynamic link library, abbreviated as DLL. When a software-in-the-loop simulation mode for one or more blocks is selected in the technical computing environment, a communication mechanism may provide for an exchange of data between the simulation engine (in particular the blocks of the block diagram being executed in the simulation engine) and the executable (created from the one or more blocks corresponding to the control program via the generated production code). Simulating the control program in a software-in-the-loop simulation mode by running the executable simultaneously with the simulation engine and exchanging data allows for simulating a complete dynamic system described by the whole block diagram.

The one or more blocks of the block diagram corresponding to the control program can have at least one input and at least one output, and the block diagram can comprise one or more second blocks, which are connected to the block diagram of the control program via corresponding outputs and inputs, wherein the one or more second blocks preferably describe the temporal behavior of a dynamical system to be controlled by the control program. This allows for studying more comprehensively the interaction between the control program and the plant modeled by the second blocks.

In an embodiment of the invention, a communication function can be introduced in the block diagram for the one or more blocks in the block diagram being converted to production code, wherein the communication function provides for an exchange of data, in particular signals, between the parts of the block diagram being simulated in the technical computing environment and the executable created from the production code, and wherein the communication function is either implemented using a script language of the technical computing environment or implemented as a simulation code using a standard programming language and then compiled by a second compiler, the second compiler being adapted to the processor of the host computer, for example, intended for simulation code compilation for the technical computing environment, the second compiler being different from the compiler intended for production code compilation.

The communication function may advantageously replace the one or more blocks for which a software-in-the-loop simulation mode has been selected and provide a mechanism for exchanging signals. The communication function may be generated by the technical computing environment, in particular based on the specification of the one or more blocks with respect to input or output ports and/or signals received or sent by these blocks. The second compiler may be specially adapted to the technical computing environment, preferably for enhanced compatibility with the simulation engine. In the case of Matlab/Simulink, the second compiler may be called MEX-compiler, and the communication function may comprise a so-called S-function. The functionality of the communication function may also be provided by a number of interconnected functions, in particular a first function being integrated in the simulation engine and a second function being external to the technical computing environment, but being connected to the executable.

The simulation mode of blocks in a block diagram can be chosen individually for at least some blocks, for example, for each block, in the technical computing environment. A further user interface may be provided for selecting a simulation mode and/or code generator for one or more additional blocks of the block diagram, in particular blocks not corresponding to the control program. When it is verified that an accelerated simulation mode has been selected in the further user interface, the one or more additional blocks are advantageously converted to a simulation code. The simulation code is compiled to a second executable using a second compiler that is adapted to the processor of the host computer, and the second executable is run on the host computer. The second compiler may be specially adapted to the technical computing environment, for example, in order to provide for enhanced compatibility with the simulation engine. The second compiler can be intended for simulation code compilation, e.g. it may be chosen by default for compiling at least parts of the block diagram. In particular, one or more functions in the simulation of a model (i.e. the execution of a block diagram) may be carried out by simulation code compiled using the second compiler. The second executable may be external or internal to the technical computing environment; running internal to the technical computing environment is intended to indicate that the second executable uses a mechanism of the technical computing environment, e.g. an interface to a further software component in the TCE. When an accelerated simulation mode has been selected for one or more additional blocks, a communication function or a combination of functions for communication may be added. Preferably, the communication function is adapted to provide for an exchange of data between the simulation engine and/or the first executable and/or the second executable. This allows for simulating, the complete dynamic system modeled by the block diagram by running the second executable simultaneously to the simulation engine and/or the first executable.

One or more reference data points can be created based on signals recorded while executing the block diagram in the technical computing environment. The technical computing environment may comprise a simulation engine that allows for a high-precision simulation of the desired behavior of the control program. Especially when the production code is highly optimized in order to allow for a fast execution also on a target platform with limited processing capability, similarity or identity of the output signals of the control program in the software-in-the-loop or processor-in-the-loop simulation to the output signals created from a direct simulation of the block diagram needs to be ascertained. By comparing the recorded data points created at least partially from the output of the production code, a validity of the optimizations applied in the generation of the production code can be confirmed.

The criteria may advantageously comprise one or more ranges in which one or more data points of the recorded data points are to be situated. This allows in particular for verifying a desired saturation e.g. in case of faulty input signals. Implementation details such as code saturation can be kept separate from the block diagram modeling the ideal behavior of the control program. Further, it allows for taking account of physical limitations of the actuators to be controlled by the embedded system.

In particular, a processor of the host computer may determine that the one or more recorded data points do not comply to the defined criteria, when the difference, preferably the absolute value of the respective difference, from the one or more data points to corresponding reference data points surpasses a predefined threshold, such as a maximum permissible absolute or relative deviation.

According to an embodiment of the invention, executing the block diagram involves calculating output values for one or more blocks using high-precision operations, in particular floating-point operations, and the executable created from the one or more blocks simulated in a software-in-the-loop simulation mode contains lower-precision operations, in particular fixed-point operations. The lower-precision operations may in particular be introduced as an optimization when generating production code. High-precision operations may e.g. involve operands of data type double, whereas lower-precision operations may involve data type single or integers, in particular integers being interpreted as values with a decimal point at a fixed position in the integer range, which may also be called fixed-point operations. When it is verified that an accelerated simulation mode has been selected for one or more additional blocks, these blocks are converted to a simulation code that comprises high-precision operations. In general, the microprocessor of the host computer which runs the second executable created from compiling the simulation code supports high-precision operation, e.g. by a floating-point unit.

The executable can be monitored via a debugging program when it is run by one or more processors of the host computer, e.g. in order to inspect the values of one or more of the variables used for calculating output signals of one or more blocks. In an embodiment of the invention, a plurality of debugging programs may be chained via mechanisms of the operating system, so that e.g. a dedicated program such as an instruction set simulator for recognizing overflows of data types may be active simultaneously to a general-purpose debugging program. Depending on the one or more debugging programs used, the executable to be analyzed may need to be compiled with a compiler being adapted to the debugging program. Because the inventive method provides for a user interface and a mechanism to choose the production code compiler independently, any debugging program may be used for analyzing the production code.

For an extended test of the control program, an embedded system comprising a microcontroller may be connected to a physical interface of the host computer. The technical computing environment may provide an additional user interface for selecting a third compiler intended for production code, the third compiler being adapted to the microcontroller of the evaluation system. When it is verified that a processor-in-the-loop simulation mode has been selected in the first user interface, the one or more blocks of the block diagram are converted to production code. The production code, i.e. the source code, is compiled to an object code with the third compiler, and the object code is transferred to the embedded system via the physical interface. While running the object code on the embedded system, one or more second data points based at least partially on the output signals from running the object code are logged. Additionally, the input signals sent from the host computer to the embedded systems may be logged. By graphically displaying or numerically comparing one or more of the data points from running the executable on the host computer to the corresponding one or more second data points, any errors introduced by the third compiler or the microcontroller can be detected. Note that different blocks in the diagram may be simulated in different simulation modes at the same time. For instance, a first group of blocks may be simulated in a software-in-the-loop simulation mode, a second group of blocks may be simulated in a processor-in-the-loop simulation mode, and a third group of blocks may be simulated in the TCE's simulation engine concurrently, and the groups of blocks may exchange signals in a synchronized manner by communication functions.

One aspect of the invention also concerns a non-transitory computer readable medium containing instructions that, when executed by a microprocessor of a computer system, cause the computer system to carry out an inventive method as described above or in the appended claims.

In a further aspect of the invention, a computer system is provided which comprises a processor, a random access memory, a graphics controller connected to a display, a serial interface connected to at least one human input device, and a nonvolatile memory, in particular a hard disk or a solid-state disk. The nonvolatile memory comprises instructions that, when executed by the processor, cause the computer system to carry out an inventive method.

The processor may be a general-purpose microprocessor that is customary used as the central processing unit of a personal computer or it may comprise one or a plurality of processing elements adapted for carrying out specific calculations, such as a graphics-processing unit. Alternatively, the processor may comprise or be implemented on a programmable logic device.

The computer system may further comprises an external interface and an embedded system connected to the external interface, the embedded system can contain a microcontroller that may be of a different processor architecture than the microprocessor, in particular being limited to lower-precision operations.

In an embodiment of the invention, the microcontroller of the embedded system may be replaced or complemented by a programmable logic device, such as a field-programmable gate array, which is configured to provide a defined set of operations and/or may comprise an IP core microprocessor.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
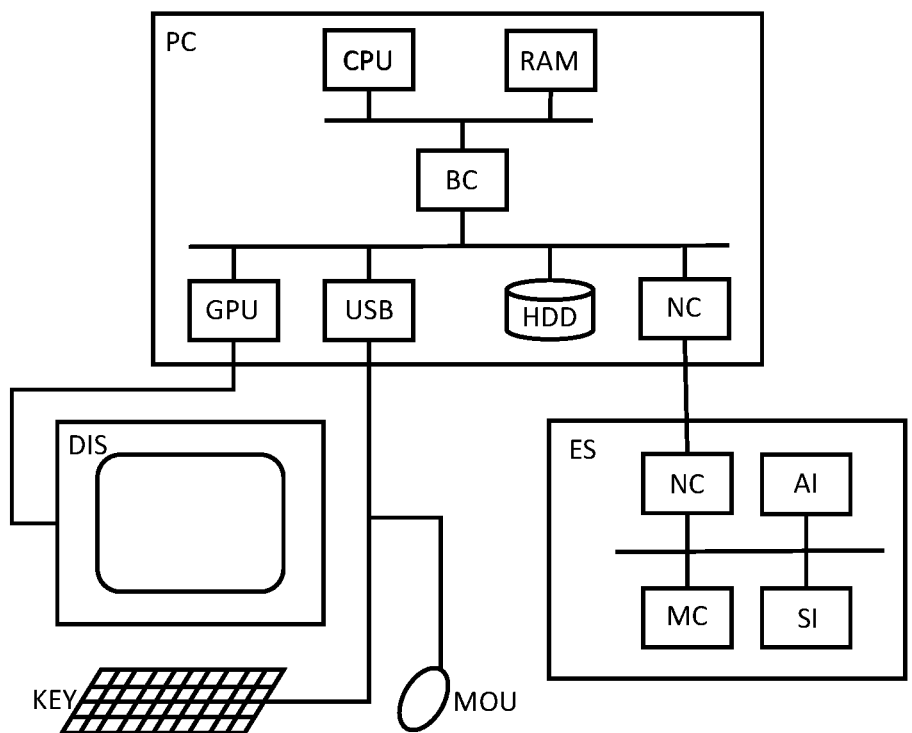
FIG. 1 is an exemplary diagram of a computer system.

FIG. 1 illustrates an exemplary embodiment of a computer system.

The shown embodiment comprises a host computer PC with a display DIS and human interface devices such as a keyboard KEY and a mouse MOU; further, an embedded system ES is depicted, which may e.g. be used for a processor-in-the-loop simulation.

The host computer PC comprises at least one processor CPU with one or multiple cores, a random access memory RAM and a number of devices connected to a local bus (such as PCI Express), which exchanges data with the CPU via a bus controller BC. The devices comprise e.g. a graphics-processing unit GPU for driving the display, a controller USB for attaching peripherals, a non-volatile memory HDD such as a hard disk or a solid-state disk, and a network interface NC. Preferably, the non-volatile memory comprises instructions that, when executed by one or more cores of the processor CPU, cause the computer system to carry out a method according to one of the claims.

The embedded system ES comprises a network interface NC, an actuator interface AI and a sensor interface SI as well as a microcontroller MC. As an alternative or addition to the microcontroller MC, the embedded system ES may comprise a programmable logic device such as a field-programmable gate array. The programmable logic device may contain a hardwired digital signal processor and it may be configured to comprise an IP core microprocessor. Preferably, the embedded system ES is connected to the personal computer PC via the network interface NC, which may e.g. be of USB, RS-232 or Ethernet type. The embedded system may comprise a non-volatile memory that comprises instructions to be carried out by the microcontroller or a configuration to be loaded on the programmable logic device.

In alternative embodiments of the invention, which are not shown in the figure, the host computer may comprise one or more servers comprising one or more processing elements, the servers being connected to a client comprising a display device and an input device via a network. Thus, the technical computing environment may be executed partially or completely on a remote server, such as in a cloud computing setup. A personal computer may be used as a client comprising a display device and an input device via a network. Alternatively, a graphical user interface of the technical computing environment may be displayed on a portable computing device, in particular a portable computing device with a touch screen interface or a virtual reality device.

In alternative embodiments of the invention, which are not shown in the figure, the computer system does not comprise an embedded system ES. While the embedded system ES is useful for carrying out a processor-in-the-loop simulation of a control program, the presence of an embedded system may not be necessary for carrying out the present invention.

Figure 2:
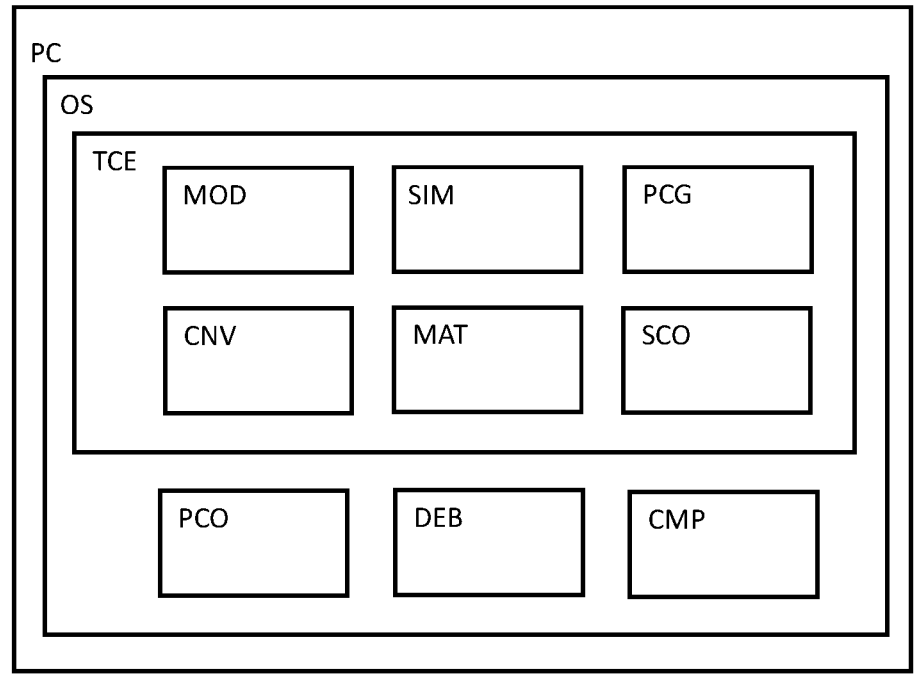
FIG. 2 is an exemplary diagram of software components in a computer system.

FIG. 2 displays an exemplary embodiment of the software components being executed on a computer system, which may be realized as a host computer PC with a standard microprocessor that runs a standard operating system OS such as Microsoft Windows or a Linux distribution.

On the host computer PC, a technical computing environment TCE such as Matlab/Simulink of The Mathworks may be installed. Other examples of technical computing environments comprise Labview of National Instruments or ASCET of ETAS. The technical computing environment TCE comprises a plurality of software components such as a modelling environment MOD, a simulation engine SIM and a converter CNV. Additionally, the TCE may comprise a mathematical and/or script interpreter MAT that is adapted for carrying out calculations or modifying data, and a simulation code compiler SCO. The TCE comprises a production code generator PCG that is adapted to produce production code from a model. The expression that a software component is comprised in the TCE is intended to encompass the case that the software component uses a specific mechanism of the TCE such as an application-programming interface of the TCE in order to exchange data and/or instructions with other software components in the TCE. For example, a software component may be realized as or comprise an add-on such as a toolbox for the modelling environment.

The modelling environment MOD may provide a graphical user interface for creating and modifying block diagrams that preferably describe the temporal behavior of a dynamic system. Additionally, blocks adapted for describing finite states and conditions for transitions between states may be used to model the dynamic system. A block may describe an atomic operation, such as an arithmetic calculation or a logic expression, or it may represent a subsystem that is described in more detail by an additional block diagram in a subordinate hierarchical level. Alternatively, it may contain code in a higher-level programming language, in particular a dynamic language intended for mathematical programming, that realizes the block's functionality. Multiple blocks may be connected by signals for the exchange of data. For example, an initial block may receive a signal of type single as input signal, may modify the signal e.g. by adding a constant and may send an output signal of type double to a further block. It may be said that the further block is downstream of the initial block because they are connected by a signal path so that data flows from the initial block to the further block.

The simulation engine SIM may be adapted to execute a block diagram created in the modelling environment MOD in order to observe the temporal behavior of the dynamic system described by the block diagram. The execution of a block diagram may also be called a model-in-the-loop simulation of the dynamic system and is preferably carried out using high-precision operations in order to observe the behavior more closely and to create reference data.

A converter CNV may be invoked to convert the block diagram to a form that can be simulated more quickly. The form may for instance be simulation code such as plain C-Code containing high-precision operations. Thus, the converter CNV may e.g. be realized as a code generator for non-optimized code. The converter may invoke a simulation code compiler SCO adapted to the TCE. In order to speed up the conversion process, converter and/or compiler may not apply any optimizations or limit the extent of applied optimizations. The use of a converter allows for simulations in an accelerated mode, so that the time for carrying out the calculations in a simulated time step is reduced.

The production code generator PCG allows for creating production code from one or more blocks in a block diagram. Production code may be optimized for readability, traceability, safety, low-energy consumption, execution speed and/or memory requirements. Preferably, the code generator provides a user interface for setting a plurality of options for adapting the customization of the generated code. Customization options may include target-specific optimizations for the microcontroller of the embedded system and enforcing compliance of the generated code to a specific standard, such as the MISRA C guidelines. A production code generator (PCG) can be, for example, TargetLink of dSPACE.

Other software components such as a production code compiler PCO, a debugger DEB or a comparison tool CMP may also be installed on the computer. These software components may be interfaced to each other and/or the technical computing environment using standard mechanisms of the underlying operating system OS. The compiler COM may generate an executable for the microprocessor of the PC or it may generate an object code for the microcontroller of the embedded system. Additionally, it may be configured to generate additional debugging information and to include it in the executable. In this way, the debugger DEB can e.g. be used for observing the value of a signal during a software-in-the-loop simulation of the generated production code. Depending on the intended use, the observed values may be directly displayed to the user and/or they may be logged in a memory, e.g. in RAM, in a file or a database.

Figure 3:
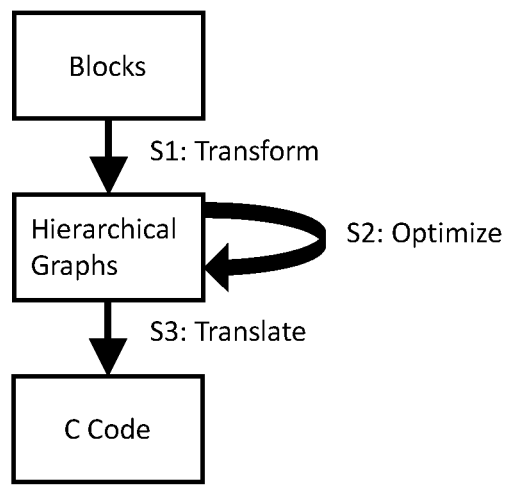
FIG. 3 is an exemplary diagram of a method for generating production code from a block diagram.

FIG. 3 illustrates an exemplary embodiment of the generation of production code from one more blocks in a block diagram. The following steps are preferably carried out by a microprocessor on the host computer; alternatively, a client server setup may be used so that computationally expensive steps are carried on a remote server containing a plurality of microprocessors.

In a first step S1, the selected one or more blocks (or, if selected, the entire block diagram) and related input data are transformed to an intermediate representation such as one or more hierarchical graphs. These hierarchical graphs may in particular comprise a data flow graph, a control flow graph and/or a tree structure. Related input data may e.g. be extracted from a database associated with the block diagram.

In a second step S2, the hierarchical graphs are optimized in order to reduce the number of variables required and/or the number of operations or instructions to be carried out. This optimization may comprise a plurality of intermediate steps on further intermediate representations between block level and production code level. In each step, an initial set of hierarchical graphs or an intermediate language is converted to a modified set of hierarchical graphs or an intermediate language while applying one or more optimization rules. A number of strategies such as constant folding or elimination of dead code may be applied during optimization.

In a third step S3, the optimized intermediate representations such as optimized hierarchical graphs are translated to code in a high-level or low-level programming language, preferably C code. The code may be further optimized in this step and restricted to a subset of the linear or parallel programming language, the control and dataflow structures may be restricted to precisely specified variants, the scope of functions and data may be restricted according to accurately specified rules. Alternatively or in addition, additional information may be added to the code, e.g. in the form of comments, to enhance readability or help in debugging the code.

In alternative embodiments, hardware-level code or a configuration for a programmable hardware device may be created from the blocks describing the control program.

Figure 4:
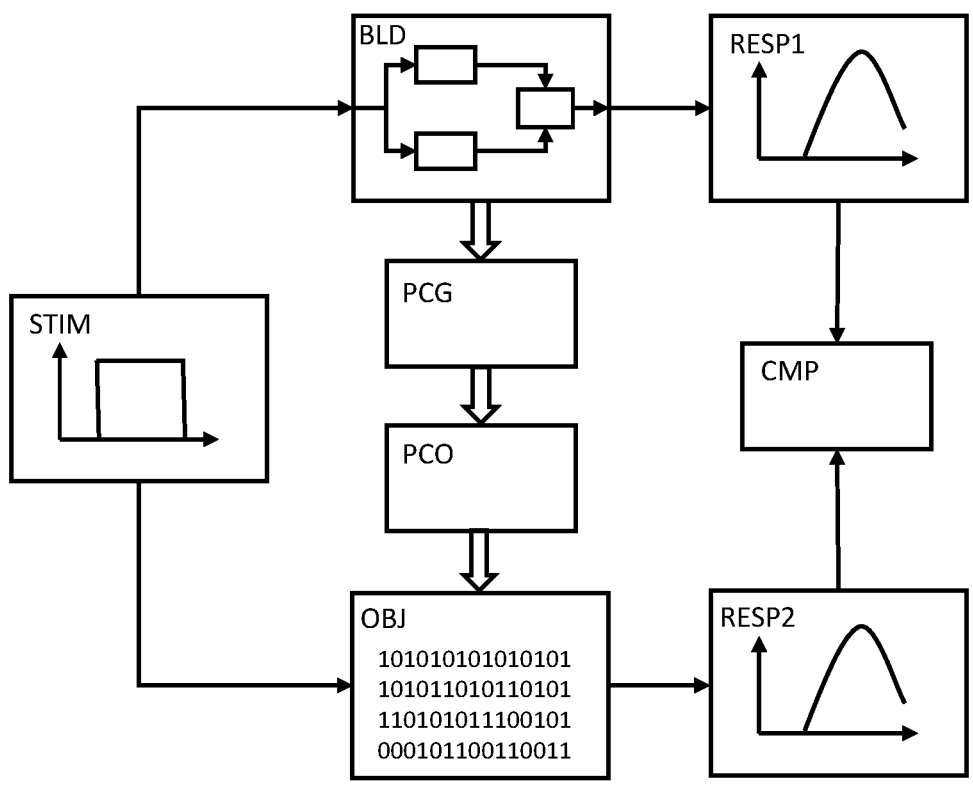
FIG. 4 is an exemplary diagram of a method for testing the compliance of the executable with a model specifying the desired behavior.

FIG. 4 displays an exemplary embodiment of a method for compiling and testing a control program.

The modelling environment MOD of the TCE preferably comprises a graphical user interface for modifying a block diagram BLD, which may comprise a plurality of blocks interconnected by signal paths. Each block may be an atomic block providing a specific functionality or it may represent a subsystem or a submodel, which comprise a plurality of subordinate blocks that are shown in a lower hierarchical level. Blocks may be connected by signals which may be of scalar or composite type and which can be represented by arrows indication the direction of the data flow. In the shown example, the block diagram comprises three blocks, an input port for receiving an input signal and an output port for sending an output signal. Preferably, the block diagram describes the predetermined or intended behavior of a control program. Upon activation of the simulation engine in the technical computing environment, the block diagram BLD is executed and results are calculated for each time step. The block diagram may be interpreted directly or it may be converted to an intermediate form that allows for a faster execution in the simulation engine.

Preferably, a number of test cases for the control program have been deduced from the specification and intended application of the control program. Advantageously, a test case comprises a stimulus STIM sent as an input signal to the control program and a corresponding response RESP received as an output signal from the control program. In the shown example, the stimulus STIM is represented by a diagram depicted a particular temporal behavior of the input signal. When the control program is executed in the simulation engine on the host computer, operations corresponding to the block diagram BLD are carried out for a plurality of time steps. During each time step, the current value of the stimulus STIM is fed to the appropriate input ports of the block diagram, the block diagram BLD is being executed in the simulation engine, so that signals are being manipulated and a new internal state of the model may be reached. By simulating the model given in the block diagram for a predetermined duration and by recording the output signal, a response RESP1 can be determined in a model-in-the-loop simulation. A model-in-the-loop simulation mode may be used for verifying that the block diagram executed in the simulation engine actually describes the intended behavior of the control program. All arithmetic calculations can be carried out with high-precision operations, e.g. using the floating-point data type double for the variables. As a result, the simulation is sufficiently accurate to use the recorded output signals as reference data.

Once correctness of the model has been established and reference data has been stored, the blocks corresponding to the control program are converted to program code via the production code generator PCG. The generated production code is then compiled to object code or an executable using the production code compiler PCO; an object code is binary data that contains instructions for a particular processor. When the object code is combined with additional information for the operating system of the host computer, an executable for the host computer is formed. Settings applied during the code generation may comprise a conversion to lower-precision operations that are computationally more efficient, e.g. integer instructions for fixed-point calculations, so that the control program later can be executed in real-time on the microcontroller of an embedded system.

In order to verify that the calculations of the generated code are sufficiently accurate and match the behavior of the blocks in the graphical model, a software-in-the-loop simulation or a processor-in-the-loop simulation may be carried out. The object code or the executable OBJ, which may be in the form of a DLL, contains calculations corresponding to the block diagram. During a predetermined duration, a stimulus STIM is fed to the object code or executable OBJ, and the output signals are recorded to obtain a response RESP2.

The response RESP1 of the model-in-the-loop simulation may be displayed on the host computer simultaneously with the response RESP2 of the generated code, so that a visual comparison may be performed by the user. Additionally or alternatively, the response RESP1 and RESP2 may be compared in a comparison tool CMP, so that a number of checks for compliance to predetermined conditions may be carried out. Preferably, the output signals are compared point by point; in particular, the absolute difference between a data point in RESP1 and the corresponding data point in RESP2 may be calculated. By comparing the differences to a threshold indicating a maximum permissible difference, the correctness of the optimizations applied when generating and compiling the code can be verified.

Figure 5:
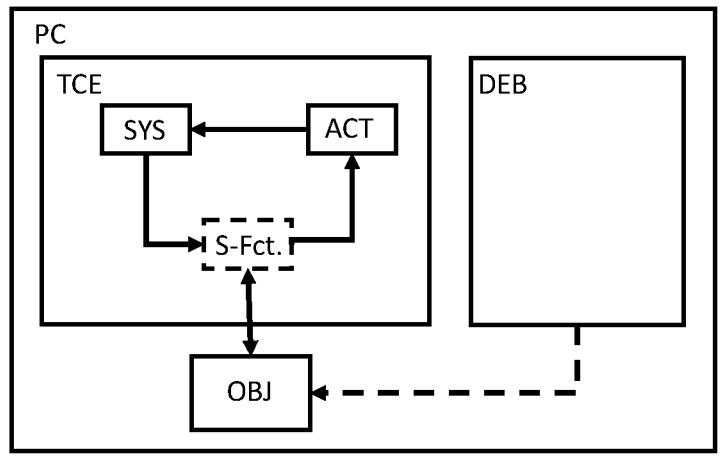
FIG. 5 is an exemplary diagram of a software-in-the-loop simulation.

FIG. 5 illustrates an exemplary embodiment of a software-in-the-loop simulation, i.e. a simulation for which production code is generated and compiled, the resulting executable then being run on the host computer. In a software-in-the-loop simulation, the effect of converting high-precision operations to lower-precision operations on the accuracy of the control can be observed. When high-precision operations, in particular operations on a double precision data type, are converted to lower-precision operations, in particular fixed-point operations, quantization errors, overflows or saturation effects may occur.

As indicated by the outermost rectangle, each step of a software-in-the-loop simulation is carried out by a processor of the host computer PC. The host computer may e.g. be realized as a personal computer running a standard operating system such as Windows or Linux. When the host computer is equipped with a multicore processor, i.e. a microprocessor comprising multiple processor cores on a single chip, different software components may be run on different processor cores; also each component may make use of several processor cores for speed up of its execution.

The technical computing environment TCE comprises a simulation engine for executing block diagrams; the simulation engine may in particular comprise a solver. At least one block or subsystem SYS corresponding to a model of the plant, i.e. the dynamical system to be controlled, is executed in the simulation engine. The plant model block SYS may comprise an arbitrary number of subordinate blocks. At least one signal, e.g. a sensor output, is sent from the plant model block to a communication function S-Fct., which is integrated with the simulation engine of the technical environment. In the picture, signals are represented by arrows from a sending block to a receiving block.

The communication Function S-Fct. provides for an exchange of signals, which may be represented by the value of a variable, with an executable OBJ. The executable OBJ containing the compiled production code may e.g. be realized as a dynamic link library in the operating system of the host computer. Input/Output signals of the executable OBJ are sent/received by the communication function and transferred from/to the simulation environment. Also other data interesting for analysis during this testing process maybe collected and transferred from/to the executable OBJ, for example coverage data. In the shown example, the block diagram comprises an actuator model block ACT, which modifies the output signals of the executable OBJ and sends the resulting signal to the plant model SYS. As a result, a closed-loop simulation of the complete dynamical system comprising plant and controller can be performed.

The executable OBJ is external to the computing environment, and thus may be analyzed by an arbitrary debugger using mechanisms of the operating system of the host computer PC unobstructed by components of the TCE in between. In the shown example, a debugger DEB indicated as a rectangle analyzes the executable OBJ, as indicated by a dashed arrow. Thus, a software-in-the-loop simulation allows for a fast and efficient testing of the control program implemented in the production code.

Figure 6:
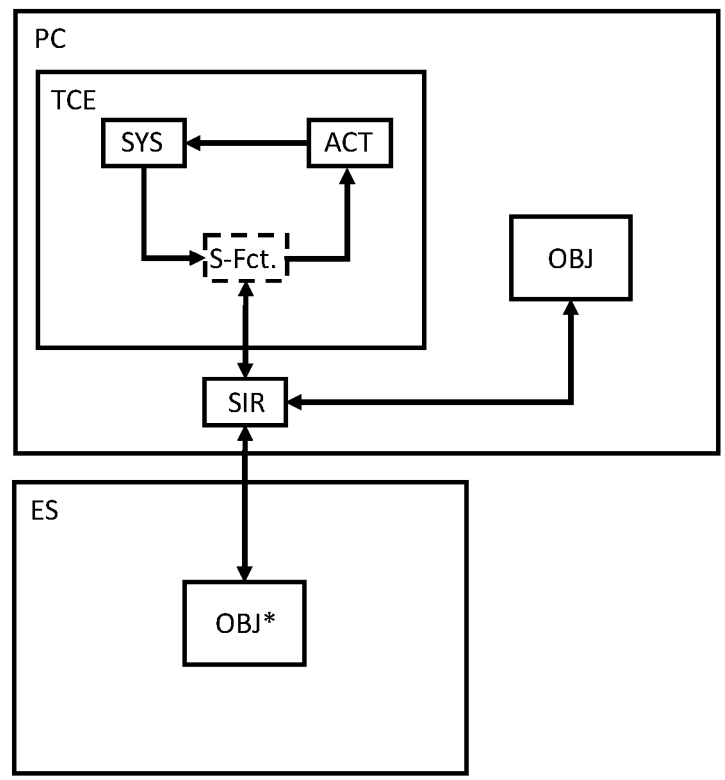
FIG. 6 is an exemplary diagram of a test environment allowing for switching between a software-in-the-loop simulation mode and a processor-in-the-loop simulation mode.

FIG. 6 displays an exemplary embodiment of a test environment that allows for switching between a software-in-the-loop simulation mode and a processor-in-the-loop simulation mode. An upper rectangle indicating the host computer PC and a lower rectangle indicating an embedded system ES are shown in the figure. The host computer PC and the embedded system ES are connected via a dedicated interface; the dedicated interface may restrict the data transfer speed, so that only a limited number of signals or corresponding variables may be exchanged without excessive slowing of the simulation and thus the debugging capabilities may be considerably limited.

As in the previous figure, the technical computing environment TCE comprises a simulation engine which executes a plant model SYS and may execute an actuator model ACT. In the shown test environment, a communication function S-Fct. is adapted to provide for an exchange of signals between the simulation engine in the TCE and the signal router SIR.

The signal router SIR allows for exchanging signals between the simulation engine and/or one or more executables; it is external to the technical computing environment, so that it uses neither the modeling environment MOD, nor the simulation engine SIM, nor the script interpreter MAT, but is only connected to the communication function S-Fct. for a transfer of signals. The signal router may be realized as a standalone executable or as a library routine, in particular a DLL, in the operating system of the host computer.

The test environment comprises a host environment for executing the control program OBJ on the host computer and a target environment for executing the control program OBJ* on the embedded system. Preferably, the signal router allows for static or on-the-fly switching between a software-in-the-loop simulation and a processor-in-the-loop simulation by redirecting the exchanged signals. Further, it is possible to simulate several subsystems or submodels in a software-in-the-loop or a processor-in-the-loop simulation mode at once by the router routing the corresponding signals for each.

When a processor-in-the-loop simulation is performed, the production code is cross-compiled on the host computer to create an executable OBJ* that is subsequently being run on another processor, in particular a microcontroller of an embedded system. In a processor-in-the-loop simulation, both the correctness of the code generator, preferably configured according to a specific set of options, and the correctness of the compiler for the target platform, preferably also configured according to a specific set of options, can be verified.

When a software-in-the-loop simulation is performed, the effect of converting high-precision operations to lower-precision operations on the accuracy of the control can be observed in order to check the correctness of the code generator. Using the mechanisms of the operating system of the host computer, a plurality of dedicated programs such as a stand-alone debugger may be interfaced to the executable OBJ for a fast and extensive analysis of the control program implemented in the production code.

Figure 7:
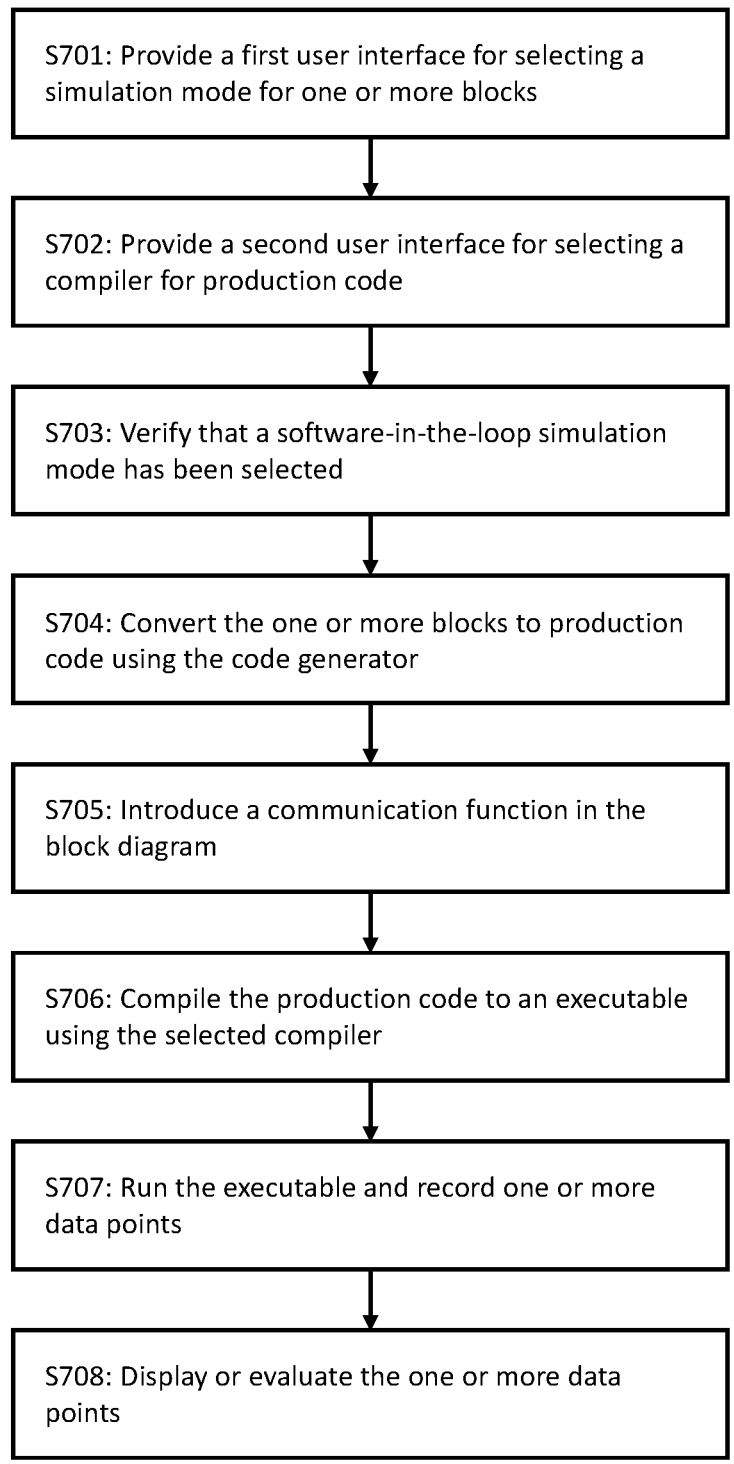
FIG. 7 is an embodiment of the inventive method.

FIG. 7 displays an embodiment of the inventive method for testing a control program. This embodiment of a computer-implemented method for testing a control program comprises: providing, in step S701, a first user interface in the technical computing environment for selecting a simulation mode for one or more blocks of the block diagram, in particular the one or more blocks corresponding to the control program; providing, in step S702, a second user interface in the technical computing environment for selecting a compiler intended for production code compilation, the compiler being adapted to the processor of the host computer; verifying, in step 703, by the host computer that a software-in-the-loop simulation mode has been selected in the first user interface; converting, in step 704, the one or more blocks of the block diagram to a production code using a code generator in the technical computing environment; introducing, in step 705, by the host computer a communication function in the block diagram as a replacement for the one or more blocks in the block diagram being converted to production code, wherein the communication function is either implemented using a script language of the technical computing environment or implemented as a simulation code using a standard programming language and then compiled by a second compiler, the second compiler being adapted to the processor of the host computer but different from the compiler intended for production code compilation; compiling, in step 706, by the host computer the production code to an executable using the compiler selected in the second user interface; running, in step 707, the executable on the host computer in an operating system of the host computer, while recording one or more data points based on output signals and/or input signals of the executable; and in step 708, displaying the one or more data points, additionally or alternatively evaluating by a processor of the host computer the compliance of the one or more data points to one or more criteria, in particular comparing the one or more recorded data points to reference data points.

Those skilled in the art will appreciate that the order of at least some of the steps may be changed without departing from the scope of the claimed invention. For instance, the selection of a simulation mode may be carried out before or after generating a production code and/or selecting a compiler for the production code.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for testing a control program, the control program being modeled as one or more blocks of a block diagram in a technical computing environment on a host computer, the one or more blocks of the block diagram describing a predetermined or intended behavior of the control program, the method comprising:
providing, in the technical computing environment, a first user interface for selecting a simulation mode for the one or more blocks of the block diagram;
providing, in the technical computing environment, a second user interface for selecting a compiler intended for production code compilation, the compiler being adapted to a processor of the host computer;
verifying by the processor of the host computer that a software-in-the-loop simulation mode has been selected in the first user interface for the one or more blocks of the block diagram corresponding to the control program;
converting the one or more blocks of the block diagram to a production code using a code generator in the technical computing environment;
compiling the production code to an executable using the compiler selected in the second user interface;
running the executable in an operating system of the host computer, while recording one or more data points based on output signals and/or input signals of the executable; and
displaying the one or more data points on a display of the host computer, or evaluating by the processor of the host computer the compliance of the one or more data points to one or more criteria.

2. The method of claim 1, wherein the one or more blocks of the block diagram corresponding to the control program have at least one input and at least one output, wherein the block diagram comprises one or more second blocks, which are connected to the block diagram of the control program via corresponding outputs and inputs, and wherein the one or more second blocks describe a temporal behavior of a dynamical system to be controlled by the control program.

3. The method of claim 1, wherein a communication function is introduced by the processor of the host computer in the block diagram for the one or more blocks of the block diagram being converted to the production code, wherein the communication function provides for an exchange of data or signals between parts of the block diagram being simulated in the technical computing environment and the executable created from the production code, and wherein the communication function is either implemented using a script language of the technical computing environment or implemented as a simulation code using a standard programming language and then compiled by a second compiler, the second compiler being adapted to the processor of the host computer and being intended for simulation code compilation for the technical computing environment, the second compiler being different from the compiler intended for production code compilation.

4. The method of claim 1, wherein the simulation mode for the one or more blocks of the block diagram are chosen individually for at least some blocks or for each block in the technical computing environment, further comprising:
providing in the technical computing environment a further user interface for selecting the simulation mode and/or a code generator for one or more additional blocks of the block diagram or blocks not corresponding to the control program;
verifying that an accelerated simulation mode has been selected in the further user interface;
converting the one or more additional blocks to a second simulation code;
compiling the second simulation code to a second executable using a second compiler, the second compiler being adapted to the processor of the host computer intended for simulation code compilation for the technical computing environment; and
running the second executable on the host computer concurrently or simultaneously with the executable and/or a simulation engine.

5. The method of claim 1, wherein evaluating the one or more criteria comprises verifying that the one or more data points are situated in one or more predefined ranges, and wherein the one or more data points are determined not to comply to the one or more criteria when at least one data point surpasses a predefined maximum value or is lower than a predefined minimum value.

6. The method of claim 1, wherein evaluating the one or more criteria comprises comparing the one or more data points to one or more reference data points, and wherein the one or more data points are determined to fulfill the one or more criteria when an absolute difference from a recorded data point to a corresponding reference data point is smaller than a predefined threshold for each of the one or more data points.

7. The method of claim 6, wherein the one or more reference data points are created based on signals recorded while executing the block diagram in a simulation engine of the technical computing environment.

8. The method of claim 7, wherein executing the block diagram in the simulation engine of the technical computing environment comprises calculating output values for the one or more blocks of the block diagram using high-precision operations or floating-point operations, and wherein the executable contains lower-precision operations or fixed-point operations.

9. The method of claim 1, further comprising monitoring the executable via a debugging program running in the operating system of the host computer to inspect values of one or more variables used for calculating output signals of the one or more blocks of the block diagram.

10. A computer-implemented method for testing a control program, the control program being modeled as one or more blocks of a block diagram in a technical computing environment on a host computer, the one or more blocks of the block diagram describing a predetermined or intended behavior of the control program, the method comprising:
providing in the technical computing environment a first user interface for selecting a simulation mode for the one or more blocks of the block diagram,
providing in the technical computing environment a second user interface for selecting a compiler intended for production code compilation, the compiler being adapted to a processor of the host computer;
verifying by the processor of the host computer that a software-in-the-loop simulation mode has been selected in the first user interface;
converting the one or more blocks of the block diagram to a production code using a code generator in the technical computing environment;
introducing, by the processor of the host computer, a communication function in the block diagram as a replacement for the one or more blocks of the block diagram being converted to the production code, wherein the communication function is either implemented using a script language of the technical computing environment or implemented as a simulation code using a standard programming language and then compiled by a second compiler, the second compiler being adapted to the processor of the host computer but different from the compiler intended for production code compilation;

compiling the production code to an executable using the compiler selected in the second user interface;

running the executable on the host computer in an operating system of the host computer while recording one or more data points based on output signals and/or input signals of the executable; and displaying the one or more data points or evaluating by the processor of the host computer the compliance of the one or more data points to one or more criteria or comparing one or more recorded data points to one or more reference data points.

11. The method of claim 10, wherein the one or more blocks of the block diagram corresponding to the control program have at least one input and at least one output, wherein the block diagram comprises one or more second blocks, which are connected to the block diagram of the control program via corresponding outputs and inputs, and wherein the one or more second blocks describe a temporal behavior of a dynamical system to be controlled by the control program.

12. The method of claim 10, wherein the simulation mode for the one or more blocks of the block diagram are chosen individually for at least some blocks or for each block in the technical computing environment, the method further comprising:

providing, in the technical computing environment, a further user interface for selecting the simulation mode and/or a code generator for one or more additional blocks of the block diagram or blocks not corresponding to the control program;

verifying by the processor of the host computer that an accelerated simulation mode has been selected in the further user interface;

converting the one or more additional blocks to a second simulation code using a converter in the technical computing environment;

introducing, by the processor of the host computer, a second communication function in the block diagram as a replacement for the one or more blocks of the block diagram being converted to the second simulation code, wherein the communication function is either implemented using a script language of the technical computing environment or implemented as the simulation code using the standard programming language and then compiled by the second compiler;

compiling the second simulation code to a second executable using the second compiler; and running the second executable on the host computer concurrently or simultaneously with the executable compiled from the production code.

13. The method of claim 10, wherein the one or more reference data points are created by the processor of the host computer based on signals recorded while executing the block diagram in the technical computing environment, and wherein the one or more data points are evaluated to not comply to defined criteria, when differences or absolute differences from the one or more data points to corresponding reference data points surpass a predefined threshold.

14. The method of claim 10, wherein evaluating the one or more criteria comprises comparing, by the processor of the host computer, the one or more recorded data points to the reference data points, wherein the one or more data points are determined to fulfill the one or more criteria when an absolute difference from a recorded data point to the corresponding reference data point is smaller than a predefined threshold for each of the one or more recorded data points.

15. The method of claim 10, wherein evaluating the one or more criteria comprises comparing, by the processor of the host computer, each of the one or more recorded data points to a predetermined minimum value and to a predetermined maximum value, and wherein the one or more recorded data points are determined not to comply to the one or more criteria, when at least one recorded data point is higher than the predetermined maximum value or the at least one recorded data point is lower than the predetermined minimum value.

16. The method of claim 10, wherein executing the block diagram involves calculating, by the processor of the host computer, output values for one or more blocks using high-precision operations or floating-point operations, and wherein the executable contains lower-precision operations or fixed-point operations.

17. The method of claim 10, further comprising a step of monitoring the executable via a debugging program in order to inspect values of one or more of variables used for calculating output signals of the one or more blocks of the block diagram.

18. A non-transitory computer readable medium containing instructions that, when executed by a microprocessor of a computer system, cause the computer system to carry out the method according to claim 1.

19. A computer system comprising:
a microprocessor;
a random access memory;
a graphics controller connected to a display;
a serial interface connected to at least one human input device; and
a nonvolatile memory or a hard disk or solid state disk that comprises instructions that, when executed by the microprocessor, cause the computer system to carry out the method according to claim 1.

20. The method of claim 1, further comprising monitoring the executable via a plurality of debugging programs running simultaneously to a general-purpose debugging program.

* * * * *